United States Patent [19]
Bernusset et al.

[11] 3,840,356
[45] Oct. 8, 1974

[54] CATALYST AND PROCESS FOR STEAM REFORMING OF HYDROCARBONS
[75] Inventors: Philippe Bernusset, Salindres; Jean-Claude Deumas, Marly-Le-Roi, both of France
[73] Assignee: Produits Chimiques Pechiney-Saint Gobain, Neuilly-sur-Seine, France
[22] Filed: Apr. 22, 1971
[21] Appl. No.: 136,573

[30] Foreign Application Priority Data
May 5, 1970 France .............................. 70.16317

[52] U.S. Cl. ................. 48/214, 252/466 J, 423/654
[51] Int. Cl. ............................................. C10k 3/06
[58] Field of Search ...... 252/466 J; 23/212; 48/214; 423/654

[56] References Cited
UNITED STATES PATENTS

| 2,013,066 | 9/1935 | Porter | 23/212 |
|---|---|---|---|
| 2,038,566 | 4/1936 | Hueitner | 23/212 |
| 2,083,795 | 6/1937 | Schiller | 23/212 |
| 3,186,797 | 6/1965 | Pearce | 23/212 |
| 3,345,307 | 10/1967 | Paul | 252/455 |
| 3,359,215 | 12/1967 | Reitmeier | 252/459 |
| 3,408,171 | 10/1968 | Pupko | 48/214 |
| 3,445,402 | 5/1969 | Reitmeier | 252/466 |
| 3,507,811 | 4/1970 | Davies | 252/455 |
| 3,533,963 | 10/1970 | Senes | 252/465 |

Primary Examiner—Daniel E. Wyman
Assistant Examiner—W. J. Shine

[57] ABSTRACT

A catalyst for use in steam reforming of hydrocarbons comprising nickel oxide, magnesia and an alumina cement, with the nickel oxide and magnesia component being present in the form of a solid solution of nickel oxide in magnesia having a surface area within the range of 0.5 to 10 $m^2/g$.

14 Claims, No Drawings

CATALYST AND PROCESS FOR STEAM REFORMING OF HYDROCARBONS

This invention relates to catalysts for the steam reforming of hydrocarbons which results in the production of minimum carbon-containing deposits, which is capable of use under high pressures and which exhibits a long life.

It is known that the catalytic treatment of hydrocarbons by gases rich in steam at temperatures as high as 1000°C. can be used to produce a variety of mixtures, the compositions of which vary according to the conditions of operations, for any of a number of uses including use as fuel gas or as intermediates in chemical synthesis (e.g., in the preparation of ammonia or methanol).

A large number of elements have been used as catalysts for use in such reforming operations. The most frequently recommended catalysts include the metals of the iron group (Group VIII B of the Periodic Table), and the alkali or alkaline earth metals, and are frequently used in combination with one or more of aluminum, magnesium, vanadium, chromium, molybdenum, tungsten, uranium, thorium, rare earth metals in addition to silicon. Some of these elements are present in such catalysts in the form of stable oxides and of various combinations of oxides, while others, and particularly the metals of the iron group, more specifically play a greater catalytic role.

It has also been known for a long time that nickel can be employed in such reforming catalysts. For this purpose, it has been the practice to prepare the catalyst by mixing nickel oxide with a hydraulic binder of a cement type which serves as a support. In addition to the foregoing elements, such catalysts may also contain other oxides such as the oxides of aluminum or magnesium which form a portion of cements used as supports.

Nevertheless, the progressive evolution of processes for the steam reforming of hydrocarbons toward the use of higher pressures has given rise to a number of disadvantages stemming from the instability of such catalysts. It has been found that at high pressures, some of the components of catalysts of the type described above, such as silica, tend to be carried over by the gas flow toward the tail portion of the reactor.

In addition, such catalyst particles frequently become covered and impregnated with carbon-containing materials, thereby resulting in a decrease of their activity and in some cases their destruction. In industrial operations, it has frequently been the practice to seek to minimize such destruction of catalyst particles by significantly increasing the proportion of water employed in the reaction gases and by addition of certain elements to the catalyst. Even these remedies are not always successful in overcoming the disadvantages of the catalyst, particularly in light of the economic drawbacks from the increase in the amount of steam and in light of the fact that such catalyst additives (e.g., alkali metals) have a tendency to migrate with the silica toward the tail portion of the reactor under severe conditions of use.

It is accordingly an object of the present invention to provide a catalyst for use in the steam reforming of hydrocarbons which overcomes the foregoing disadvantages, and it is a more specific object of the invention to provide an improved catalyst for use in the steam reforming of hydrocarbons which is capable of use under high pressures and exhibits a long life while promoting the formation of a minimum of carbon-containing deposits.

The concepts of the reside invention reside in a catalyst for use in the steam reforming of hydrocarbons formed of nickel or nickel and cobalt, magnesia and a cement of lime aluminate. It has been found that when use is made of the foregoing components under appropriate conditions of preparation and of proportions as hereinafter described, there is obtained a catalyst which completely avoids the foregoing disadvantages.

In accordance with the practice of this invention, the nickel oxide and magnesia components of the catalyst are in the form of a solid solution of nickel oxide in magnesia in proportions such that the molar ratio of NiO/MgO is within the range of 0.1 to 1.0, and preferably 0.4 to 0.8. It is also important that the specific surface area of this solid solution be within the range of 0.5 to 10 $m^2/g$. It has been found that the amount of carbon deposited on the catalyst of the invention is at a minimum when the surface area of the solid solution is within this range. For best results, use should be made of a solid solution having a specific surface area within the range of 1 to 3 $m^2/g$.

The catalytically active components of the catalyst of this invention, formed by the solid solution, is added in a finely divided state to a very aluminous cement, and preferably a lime aluminate essentially free of other components. The resulting mixture is preferably mixed with water and formed into the desired shape (e.g., balls) in accordance with known techniques. The shapes thus obtained are then aged in the presence of water, dried and activated by, for example, calcination.

It is possible and sometimes desirable to admix the solid solution and aluminous cement components with alumina in the form of granules having diameters of 5 to 50 microns and having a specific surface area of 10 to 100 $m^2/g$. For this purpose, use can be made of alumina obtained by calcination of hydrargillite which plays essentially no catalytic roll but serves to facilitate formation of the composition into the desired shapes in, for example, a rotary granulator, by supplying particles having appreciable sizes.

The proportion of the solid solution of nickel oxide and magnesia in the catalyst can generally be varied within the range of 30 to 60 percent of the completed catalyst. When use is made of alumina granules as described, the amount of such alumina may vary up to 30 percent by weight of the total catalyst.

The addition of cobalt to such catalysts has been found beneficial in certain cases as still increasing their stability; the addition of this element is made like that of nickel, in the form of the solid solution of its oxide in magnesia.

In industrial practice, the preparation of the solid solution having the required specific surfaces can be made by calcination for appropriate times and at appropriate temperatures of mixtures of nickel oxides and magnesium oxides or mixtures of various compounds capable of giving these oxides by thermal decomposition. Such mixtures can be conveniently obtained by coprecipitation.

There can be produced suitable solid solutions by calcination, for a few hours, of mixtures of nickel oxides commercially available in aggregates having sizes below 50 μ and whose specific surface is of some m²/g with industrial hydrated magnesia having a granular size below 100 μ at temperatures ranging from about 800°C. to about 1300°C. In this manner the specific surfaces obtained vary from about ten or more m²/g to 0.5 m²/g, thus covering the preferred range of specific surfaces which ranges from 1 to 3 m²/g., in spite of the difference obtained in the values of these surfaces when the molar ratio of NiO/MgO varies within the specified limits.

Having described the basic concepts of the invention, reference is now made to the following examples, which are provided by way of illustration and not by way of limitation, of the practice of this invention in the preparation of catalysts in accordance with the concepts of the invention and the use of the resulting catalysts in the steam reforming of hydrocarbons. In the tests illustrated, a gasoline having a density of 0.736 g/ml. and containing less than 3 parts per million of sulfur is subjected to steam reforming to produce methane in amounts close to the amount theoretically obtainable. The reforming operation is carried out at an absolute pressure of 31 bars, at an intake temperature in the catalytic bed of about 520°C. and a maximum temperature of 750°C., with the flow rate being 0.77 liters of gasoline per liter of catalyst per hour and the amount of water corresponding to 3.5 moles per gram-atom of carbon present in the gasoline.

EXAMPLE 1

This example demonstrates the influence of the specific surface of the solid solution used in preparing the catalysts on the quantity of carbon deposited during use.

All catalysts of the series prepared in this example are prepared from mixtures of 50 percent by weight of various solid solutions, 30 percent by weight of lime aluminate cement containing 80 percent by weight of alumina and of 20 percent by weight of lime, and 20 percent by weight of alumina having a specific surface of 60 m²/g in particles sized below 50 μ. The preparation of catalysts is carried out by humidifying these mixtures with water and by forming the mixtures into balls having diameters from 3 to 6 mm in a rotary granulator. After forming, the balls are aged in a closed vessel at a moderate temperature below 80°C. The balls of catalysts are dried and then calcined for 2 hours at a temperature ranging from 850° to 950°C. Before use, they are subjected to a reducing treatment under hydrogen pressure at a temperature of about 750°C.

In all catalysts in this example, the ratio NiO/MgO of the solid solutions is the same and selected at the value of 0.5. The results obtained by using those various catalysts under previously defined conditions are stated in the following Table I. This table gives the calcination temperature of the mixture of NiO and Mg(OH)₂ oxides, the specific surface of the solid solutions obtained, the amount of carbon deposited on the catalyst and the produced amount of dry gases.

TABLE I

| Calcination temperature of the mixture NiO/Mg(OH)₂ in °C. | Specific surface of the solid solution NiO/MgO in m²/g | Deposited carbon on the catalyst in g/l of catalyst and per hour | Produced Amt. of dry gases in l/per liter of catalyst and per hour |
|---|---|---|---|
| 750 | 12.3 | >5 | 2030 |
| 830 | 3.0 | 1.4 | 2545 |
| 850 | 2.8 | 1.00 | 2840 |
| 1000 | 2.6 | 0.7 | 2515 |
| 1100 | 1.3 | 0.8 | 2390 |
| 1200 | 0.7 | 1.7 | 2520 |
| 1250 | 0.5 | 3.5 | 2500 |

This example shows that the amount of carbon deposited on the catalyst depends on the value of the specific surface of the solid solution used in the production of catalysts and that a very definite minimum of carbon deposit exists for specific surfaces in the range from 1 to 3 m²/g with the gas production otherwise being satisfactory. Moreover, it is to be noted that the duration of the tests which has been stated as being of 4 hours, is sufficient to show the differences obtained in the amounts of carbon deposited, but that the rate of carbon deposition decreases in course of time and that for a test-duration of 50 hours, the cumulated amount of carbon deposited on the catalyst is in the best case about 0.3 g. per liter of catalyst per hour.

EXAMPLE 2

This example demonstrates that the molar ratio of the amount of nickel oxide with the amount of magnesia in the solid solutions used may vary within somewhat broad limits from 0.1 to 1. For this purpose, three catalyst are prepared in the same manner as that described in the preceding example, but with solid solutions having various nickel oxide contents, their specific surfaces being somewhat different but nevertheless being within the favorable limits. The test conditions are the same as those of the preceding example. The following Table II gives the results thus obtained.

TABLE II

| NiO/MgO ratio | Specific surface of solid solutions NiO/MgO in m²/g | Deposited carbon on the catalyst in g/liter of catalyst and per hour | Produced amount of dry gases in l/per liter of catalyst and per hour |
|---|---|---|---|
| 0.13 | 2.6 | 1.8 | 2510 |
| 0.8 | 3.2 | 0.4 | 2480 |
| 1 | 0.6 | 2 | 2470 |

These results illustrate the broad range of the ratio NiO/MgO with the amount of gas produced being satisfactory for these various tests.

EXAMPLE 3

This example relates to amounts of carbon deposited on three catalysts composed merely of 50 percent by weight of solid solutions whose NiO/MgO is 0.5 and having variable specific surfaces, and of 50 percent by weight of the same aluminous cement as that used in the preceding examples.

The forming is carried out in the like manner to that used in the preceding examples although preparation of the desired shapes is more difficult as a result of the absence of alumina particles. The average crushing strength granule by granule has been measured after a hydrothermal aging obtained under a pressure of 50 bars of vapor for 100 hours at 750°C. The results are stated in the following Table III.

TABLE III

| Specific surface of solid solutions NiO/MgO in $m^2/g$. | Deposited carbon on the catalyst in g/ liter of catalyst and per hour | Crushing grain by grain in kg. on balls of 5 mm |
| --- | --- | --- |
| 10 | 4.5 | 70 |
| 3 | 1.2 | 75 |
| 0.6 | 2.5 | 75 |

This example shown the existence of an optimal zone of the values of the surfaces of the used solid solutions. Forthermore, after the hydrothermal aging test, these catalysts still shown crushing strengths having a such value that their use is possible under severe conditions.

It will be understood that various changes may be made in formulation, procedure and use without departing from the spirit of the invention, especially as defined in the following claims.

We claim:

1. A catalyst for use in steam reforming of hydrocarbons consisting essentially of a solid solution of nickel oxide in magnesia wherein the molar ratio of nickel oxide to magnesia is within the range of 0.1 to 1.0:1 agglomerated with an aluminous cement, with the solid solution of nickel oxide in magnesia having been formed prior to admixture with the aluminous cement and having a surface area within the range of 0.5 to 10 $m^2/g$, said solid solution constituting from 30 to 60 percent by weight of the catalyst.

2. A catalyst as defined in claim 1 wherein the catalyst also contains crushed alumina having a surface area within the range of 10 to 100 $m^2/g$ and being present in an amount up to 30 percent by weight of the catalyst.

3. A catalyst as defined in claim 1 wherein the surface area of the solid solution is within the range of 1 to 3 $m^2/g$.

4. A catalyst as defined in claim 1 wherein the molar ratio of NiO/MgO of the solid solution is within the range of 0.4 to 0.8.

5. A catalyst as defined in claim 1 wherein the catalyst also contains cobalt in the form of a solid solution of cobalt oxide in magnesia.

6. A catalyst as defined in claim 2 wherein the alumina is crushed to granules having diameters of 5 to 50 microns.

7. A process for the preparation of a catalyst for use in steam reforming of hydrocarbons comprising forming a solid solution of nickel oxide in magnesia having a mole ratio of nickel oxide to magnesia within the range of 0.1 to 1.0:1 and a surface area within the range of 0.5 to 10 $m^2g$, admixing the solid solution with an aluminous cement in the presence of water, with the solid solution constituting from 30 to 60 percent based upon the total weight of the catalyst, and forming the resulting mixture into the desired shape.

8. A process as defined in claim 7 wherein the surface area of the solid solution is within the range of 1 to 3 $m^2/g$.

9. A process as defined in claim 7 wherein the solid solution is admixed with the cement in the presence of crushed alumina.

10. A process as defined in claim 7 wherein the solid solution is admixed with the cement in the presence of a solid solution of cobalt oxide in magnesia.

11. A process as defined in claim 7 which includes the steps of aging the shapes in water, drying and calcining the shapes.

12. In a process for the steam reforming of hydrocarbons in which a hydrocarbon is contacted with a catalyst in the presence of steam at elevated temperatures and pressures, the improvement comprising a catalyst comprising a solid solution of nickel oxide in magnesia agglomerated with an aluminous cement, with the solid solution of nickel oxide in magnesia having been formed prior to agglomeration of the solid solution with the cement and having a surface area within the range of 0.5 to 10 $m^2/g$, said solid solution constituting from 30 to 60 percent by weight of the catalyst.

13. A method as defined in claim 12 wherein the catalyst also contains crushed alumina having a surface area within the range of 10 to 100 $m^2/g$.

14. A method as defined in claim 12 wherein the catalyst contains cobalt in the form of a solid solution of cobalt oxide in magnesia.

* * * * *